W. R. GOODRICH.
Improvement in Self-Locking Blind Butts.
No. 124,263. Patented March 5, 1872.
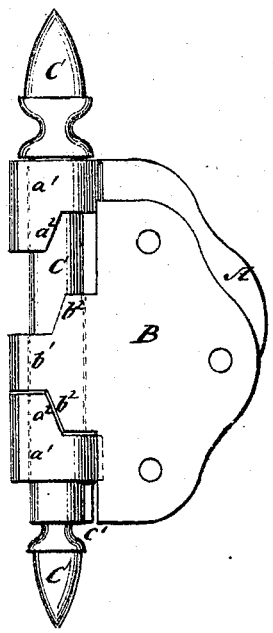
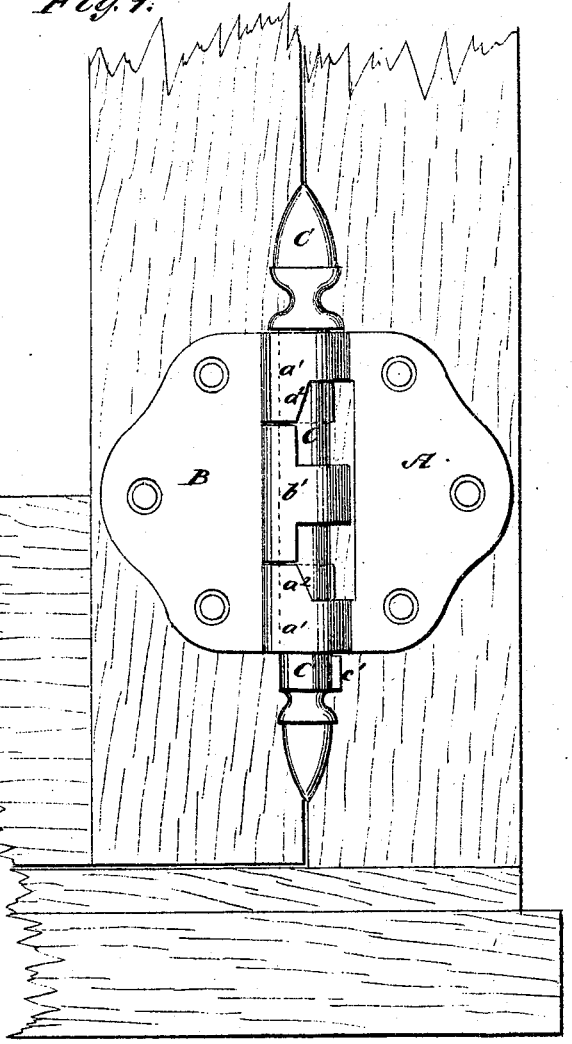
Witnesses:
E. Wolff
Geo. W. Mabee
Inventor:
W. R. Goodrich
PER
Attorneys.

124,263

UNITED STATES PATENT OFFICE.

WILLIAM R. GOODRICH, OF UTICA, NEW YORK.

IMPROVEMENT IN SELF-LOCKING BLIND-BUTTS.

Specification forming part of Letters Patent No. 124,263, dated March 5, 1872.

Specification describing a new and useful Improvement in Loose-Pin Self-Locking Blind-Butt, invented by WILLIAM R. GOODRICH, of Utica, in the county of Oneida and State of New York.

Figure 1 is a detail view of my improved butt, showing it in its position when the blind is closed. Fig. 2 is a detail view of the same, showing it in its position when the blind is opened and locked.

Similar letters of reference indicate corresponding parts.

My invention has for its object to furnish an improved reversible locking-hinge for blinds and shutters; and consists in making double-locking inclines on the male or pintle portion of the hinge, as herein described.

A and B are the two parts or plates of the butt, and C is the loose pin. The part A is designed to be attached to the window-casing and the part B to the blind. Upon the upper and lower ends of the forward edge of the part or plate A are formed two eyes, $a^1$, to receive the pin C. Upon the inner edges of the outer sides of the eyes $a^1$ are formed notches, which are made with their rear side or shoulder straight or vertical and their forward side or shoulder, $a^2$, inclined, as shown in Figs. 1 and 2. Upon the central part of the edge of the part B is formed a single eye, $b^1$, the body of which is made of such a width as to fit into the space between the eyes $a^1$, as shown in Fig. 1. The edges of the middle part of the eye $b^1$ are cut away so as to leave straight or vertical shoulders upon one side, as shown in Fig. 1, and upon the other side inclined shoulders $b^2$, as shown in Fig. 2.

By this construction, when the blind is swung fully open, the wider part of the eye $b^1$ will drop into the notch of the eye $a^1$, so that the inclined shoulder $b^2$ of the eye $b^1$ may rest against the inclined shoulder $a^2$ of the notch of the eye $a^1$ and thus lock the blind open. In closing the blind by pulling it upward and forward the inclined shoulder $b^2$ of the eye $b^1$ will slide up the inclined shoulder $a^2$ of the notch of the eye $a^1$ until the widest part of the eye $b^1$ rests upon the widest part of the eye $a^1$, allowing the blind to be swung shut freely. The inner edges of both the eyes $a^1$ and both the edges of the eye $b^1$ are made precisely alike, so that the butt can be used as a right or left butt, as may be desired. The upper end of the pin C is made with a shoulder to rest upon the upper edge of the upper eye $a^1$. Upon one side of the forward end of the pin C is formed a tongue, $c'$, which slips through a groove in the eyes $a^1$ $b^1$ $a^1$ when the pin is inserted and removed. The groove in the eye $b^1$ is made in such a position that the tongue $c'$ must be moved laterally for a short distance through the space between the eyes $a^1$ and $b^1$ before it can pass from one of said grooves to the other. This construction prevents the possibility of the pins working out accidentally.

Having thus described my invention, I claim as new and desire to secure by Letters Patent—

The notched and shouldered eyes $a^1$ $a^2$ $b^1$ $b^2$, constructed and operating in connection with each other and with the plates A B and the tongued loose-pin C $c'$, the whole forming a right-and-left-hand loose-pin self-locking butt.

WILLIAM R. GOODRICH.

Witnesses:
  E. B. HASTINGS,
  GEO. A. KINCAID.